Patented Jan. 27, 1953

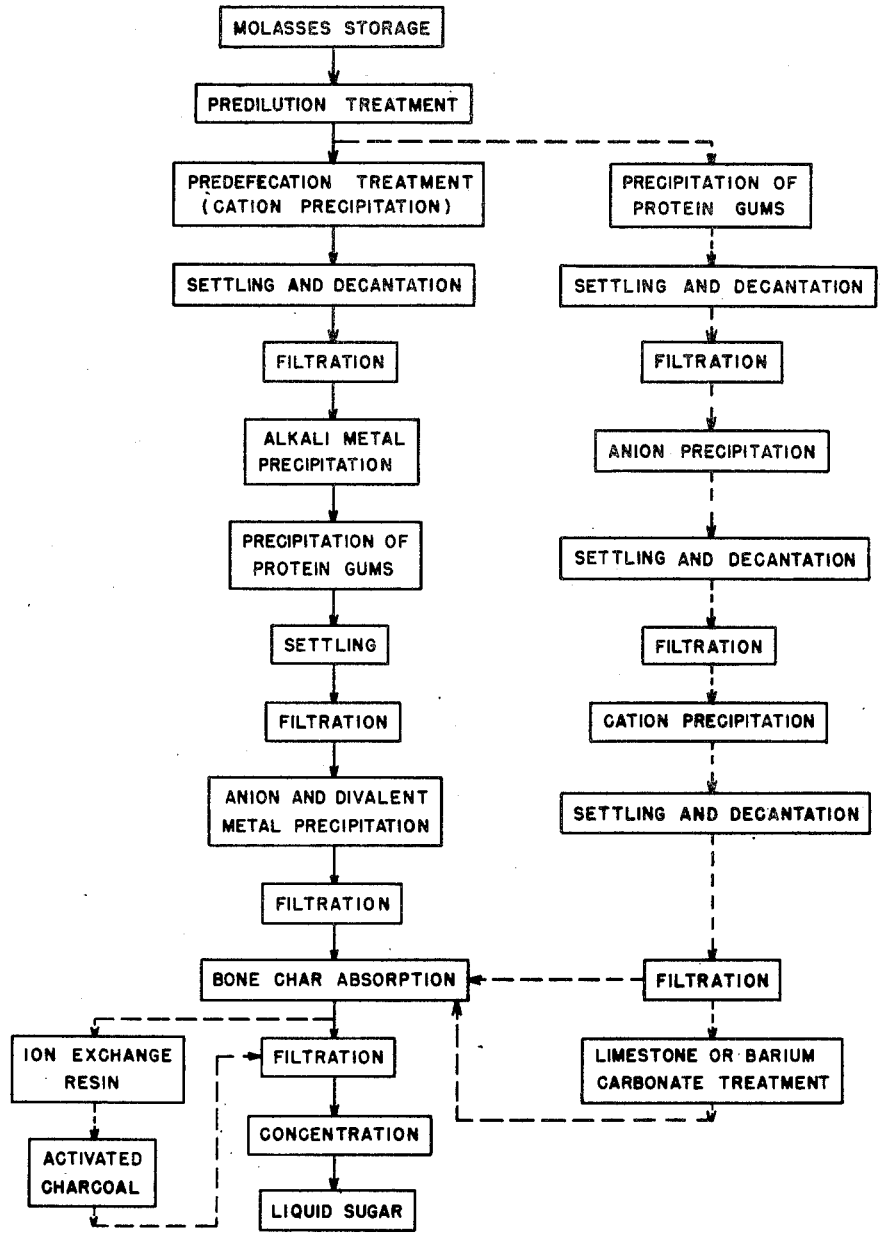

2,626,878

UNITED STATES PATENT OFFICE 2,626,878

SUGAR PURIFICATION

John Paul Bartz, Fort Lauderdale, Fla.

Application August 16, 1947, Serial No. 769,004

4 Claims. (Cl. 127—50)

This invention relates generally to the manufacture of mono and di saccharide sugars and particularly to a process and method for preparing liquid sugar and syrup from all types of molasses products made from cane, beet and fruit juices. Further consideration is given to a method for preparing liquid sugar and syrup from molasses made from starch products such as corn, wheat, potatoes, and especially from those molasses products known as Georgia cane molasses, first molasses, high test or invert molasses etc., made by the concentration of sugar cane or sugar beet juices without the removal of a significant amount of the constitutents contained in the juice. A very special consideration is given to a process and method for preparing water white liquid sugar and syrup from inedible highly pigmented resinous molasses products heretofore used for alcohol and livestock feeding purposes such as blackstrap, cane feeding molasses, beet feeding molasses, corn feeding molasses, citrus molasses and other products of commerce.

It is well known and recognized that blackstrap and cane feeding molasses contain from 25% to 35% sucrose (the table sugar of commerce) and from 18% to 25% of glucose (dextrose) and levulose sugars. Citrus molasses contains from 40% to 48% of total sugars while beet feeding molasses is composed of about 50% of sucrose and a small amount of raffinose. High test or invert molasses contains from 10% to 25% sucrose and from 50% to 60% reducing sugars. Molasses from starch materials such as corn and sweet potatoes have a total sugar content of about 70% consisting of glucose, dextrose, maltose and dextrins. It is obvious if one could remove all of the sugars from the above molasses products in an inexpensive manner and in a water white edible condition the efficiency, revenue and usefulness of the entire sugar processing operation would be enhanced for, in normal times, an enormous tonnage of sugar in the form of molasses is discarded by the sugar industry. This represents a significant loss of valuable sweetening materials from human consumption.

The removal of sugar from the above molasses products, or the processing of liquid sugar or syrup therefrom, is not a simple operation for, in addition to the sugar content, molasses contains from 1% to 11% of protein like substances in the form of albuminoids, amides, purine bodies, amino acids such as aspartic acid and the like. The removal of these protein like substances is essential in the preparation of liquid sugar and syrup but it is not an easy task. Blackstrap and commercial feeding molasses contains from 7% to 14% of minerals in the form of salts, iron rust, sand (silicon dioxide) dirt, etc., which imparts a salty and bitter taste to the molasses making it unpalatable and unfit for human consumption. These molasses products also contain from 1% to 9% of gums and pectin like bodies. These substances impart the so-called molasses flavor to syrups and also increase the difficulties of filtration for the removal of solid matter as they clog up the pores of the filter pads thus preventing the sugar solution from passing through unless it is of low concentration. In addition, the above molasses products contain small amounts of formic acid, acetic acid, citric acid, succinic acid, acid aldehydes, glucosides which are bitter and hard to remove, and the highly colored pigmented and resinous materials and compounds which must be removed if water white liquid sugar and syrup are to be prepared.

It is apparent that before one can intelligently purify, clarify and refine molasses products into liquid sugar and syrup, it is necessary to know the percentage composition of each constituent of the molasses so that one will know how to treat the molasses in the removal of the foreign and objectionable matter from the sugar. Heretofore the sugar industry and inventive genius have not given this factor much consideration but have tried to treat and process molasses products using the same amount of materials or reagents and in the same manner as if all of them contained the same constituents and had the same chemical analysis or composition. Quantitative determinations reveal that this is not true. As a result water white liquid sugar and syrup made from blackstrap, cane, citrus, beet, potato or corn feeding molasses having or containing 7% or less of non sugar solids has not been produced commercially nor is it now an article of commerce. Attempts have been made to produce table syrup from the above molasses products but in every instance the finished syrup contained more than 7% of non sugar solids which imparted a molasses or salty taste to the finished product making it undesirable in commercial products and for table use. Furthermore the color of the finished syrup was very dark which is unacceptable to the trade. In some instances the color of the finished syrup has been temporarily removed by the use of chemicals such as chlorine gas, sulphur dioxide, sodium chlorite, persulphates, percarbonates, peroxides and the like. While the color, after bleaching, is satisfactory, it has been found that in this treatment some of the sugar has been destroyed, new compounds are formed which are bitter, some are toxic. In all instances the non sugar solids have been increased and the quality and taste of the finished syrup of an inferior grade or undesirable. Heretofore, the sugar industry has spent much time, money and effort in trying to remove and recover the sugar in the molasses in a solid or crystalline form rather than a liquid state, by precipitating the sugar with chemical reagents. While it is possible to produce and obtain sugar in this manner, the compounds required are expensive, not available in the commercial quantities desired, or they are toxic when inhaled or consumed. Furthermore, the yields of sugar are low, the quality of sugar produced of inferior grade, and the cost of producing a pound of sugar prohibitive.

In recent years attempts have been made to apply ion exchange methods, used in the softening and purification of water, to the clarification and refining of molasses products. By ion exchange is meant the exchange of hydrogen ions from resinous products for cations of the aqueous molasses solution which has been allowed to flow through a column of resins. After the resins remove the cations from the molasses solution the latter becomes acid in character. The acid molasses solution is then allowed to flow or pass through another but different column of resins which will remove the anions forming a neutral or nearly neutral solution. Although the ion exchange method has found wide use in the softening and purification of water and it is useful in removing a portion of mineral matter of the non sugar solids of the molasses, there are numerous objections to its use as the sole treatment for the clarification and refining of molasses into liquid sugar. (1) Commercial tests have proven that it removes little, if any, of the protein and gums from the molasses. This is very objectionable, as feeding molasses contains from 4% to 18% protein and gums. If pure sugar, or highly refined liquid sugar or syrup, is desired from feeding molasses, this method must be placed in the discard. (2) It removes only a small portion of the highly colored pigments and resins from the molasses solution which is essential if water white sugar or liquid sugar or syrup is desired. Again, this is another reason why colorless liquid sugar cannot be prepared by this method. (3) While ion exchange will remove certain anions and cations from the molasses medium, its use for this purpose must be limited to very dilute solutions or concentrations in order that the fluid (molasses) will flow or pass through the column of resinous material, and in order that the resinous product may remove sufficient mineral constituents from the molasses to make the method worth consideration. In high molasses concentrations the gums, proteins and minerals retard or stop the molasses flow, making this method commercially impractical. (4) The initial investment is costly and the regeneration of the two types of resins by alkali and acid treatment is time consuming, and the cost for regeneration is logarithmically proportional to the amount of elements removed, thus making the treatment prohibitive except for removal of only trace elements. (5) Ion exchange will not remove bitter principles such as glucosides found in certain types of molasses.

The present invention is directed toward overcoming the difficulties heretofore encountered, and to an economical and commercial process for treating molasses whereby all or a sufficient amount of the objectionable foreign matter contained in the molasses is removed so that the liquid sugar and syrup produced therefrom is free from objectionable molasses flavors, salty taste, undesirable odors and contains not more than 7% of non sugar solids. The non sugar solids retained in the liquid sugar are the vitamins such as vitamin $B_1$, riboflavin, niacin, biotin etc., vitamin C, vitamin E, vitamin K, nucleic acids and minute amounts of the valuable nutritional salts of potassium, sodium, calcium, iron, copper and manganese in the form of phosphates, chlorides and iodides. The non sugar solids retained will also include traces of pectin.

This application is a continuation, in part, of my application Serial No. 705,805, filed October 25, 1946, now Patent Number 2,525,761.

One object of the present invention, generally stated, is to provide a process for the manufacture of mono and di saccharide sugars from molasses products.

Another object of the present invention is to provide a method and process for preparing liquid sugar and syrup from molasses products.

A further object of the present invention is to provide a process whereby blackstrap, citrus and feeding molasses, unfit for human consumption, is so treated that the objectionable foreign matter is removed so that the liquid sugar and syrup made therefrom is free of objectionable molasses flavors, salty taste, undesirable odors and objectionable mineral matter.

A particular object of the present invention is to provide a method and process for removing some of the potassium and sodium salts, all or a sufficient amount of the proteins, gums and organic acids from molasses products.

A special object of the present invention is to provide a process for preparing water white liquid sugar having 7% or less of non sugar solids from highly colored and resinous molasses products.

A final object of the present invention is to provide a process and method for preparing liquid sugar and syrup from molasses by employing chemical treatment and ion exchange in a new, novel and improved manner for bringing about new results in the efficiency of operation and in the finished syrup as well as for the removal of non sugar solids such as gums, protein, coloring matter, organic compounds and mineral constituents (ash) from the molasses.

In accordance with this invention mono and di saccharide sugars, liquid sugar, and water white refined syrups may be made and manufactured from highly colored and resinous molasses products by a stepwise but continuous commercial process, as illustrated in the drawing. My process is shown in the drawing by a general flow sheet, for illustrative purposes only. In the drawing the explanation of the steps is shortened for brevity.

Generally stated, this process and method consists of the following major steps:

(1) Predefecation, preclarification and partial hydrolysis treatment; (2) alkali metal precipitation; (3) precipitation of proteins, gum and glucosides; (4) precipitation of anions and divalent metals; (5) bone char adsorption; (6) ion exchange; (7) concentration.

The steps in my process may be to some extent rearranged as will be evident to one skilled in the art. Thus, for example, the protein and gum precipitation, step (3), may be carried out before the alkali metal precipitation, step (2). In other words, the organic impurities may be substantially removed before the mineral impurities are removed. Other alternate variations in the process are shown by dotted lines in the drawing.

By liquid sugar is meant a liquid sweetening material consisting of a mixture of mono and di saccharide sugars such as sucrose, glucose (dextrose) levulose (fructose) and traces of pentose, tri and poly saccharide sugars; said sweetening material containing not more than 7% of non sugar solids such as B vitamins (vitamin $B_1$, riboflavin, niacin etc.), vitamin C or ascorbic acid, vitamin E, neuclic acids, valuable nutritional minerals, phosphates, etc., and not less than three micrograms of non sugar solids per 100 grams of liquid sugar or syrup. The hydrogen ion concentration of said liquid sugar ranges from a pH of 4.0 to 10.0. The most desirable range is from 5.2 to 7.2. The polarization of the liquid sugar or syrup ranges from +62.0 to −88.0 when measured at 20° C. The most frequent and most desirable polarization range of liquid sugar made from molasses is from +20.0 to −19.0 when measured at 20° C.

In accordance with this invention mono and di saccharide sugars, liquid sugar and syrup may be made and produced from any molasses derived from cane, beet or fruit juices. To specifically illustrate the present invention wherein mono and di saccharide sugars, liquid sugar and syrup may be produced and manufactured from any highly colored resinous molasses, blackstrap or cane feeding molasses will be used and the following illustration cited:

600 gallons of water is pumped into a wooden or stainless steel or glass lined tank and approximately 150 gallons (1755 pounds) of blackstrap cane molasses is then added and the mixture stirred or agitated thoroughly. The Brix of the molasses mix should be adjusted so that it ranges from 5° to 20° for best results. As high as 60 Brix has been employed in this operation, but aqueous solutions work best. One eighth percent to 2% of oxalic acid (concentrated) diluted 1:5 is then added to the molasses mix followed by the addition of one half percent to 2% activated vegetable charcoal and one half percent to 2% of fuller's earth, kieselguhr or asbestos based on molasses weight. The mixture is then stirred from thirty minutes to one hour and allowed to settle for two to twelve hours. In this operation I have discovered that the oxalic acid in the presence of fuller's earth brought about a condition whereby part of the sodium, potassium and hydroxyl ions from the molasses solution were adsorbed by the fuller's earth when the hydrogen ion concentration of the molasses ranged from a pH of 2.0 to 7.0. A pH of 3.5 is to be preferred. The fuller's earth also adsorbs coloring matter and organic material. In addition those cations which form insoluble oxalates are precipitated. This treatment removes barium, calcium, strontium, lead, zinc, magnesium, aluminum, iron, manganese ions from the field of action. Only spectroscopic traces of these elements will remain in solution. Any other organic acid such as sulphonic acid or acid derivatives of same or any mineral acid such as meta phosphoric acid, sulphuric acid, etc., which will form insoluble salts with the last mentioned type of cation in the molasses and which will react or bring about a condition in the fuller's earth so that it will absorb or remove alkali metals or coloring elements may be used for this purpose in the place of oxalic acid. Finely ground asbestos, kaolin, kieselguhr, infusorial earth, etc., may be used in place of fuller's earth. These absorbent materials may be made more efficient by treating them with 10% solution of hydrochloric or sulphuric acid for 10 to 30 minutes, decanting off liquid, washing the treated earth with water and heating in a furnace at 660° C. to 1000° C. for one hour.

In order to facilitate the removal of objectionable pigments and colored resins from the molasses and to insure against the possibility that any of these constituents will remain at the end of the operation a small amount of activated vegetable charcoal is introduced at this point. This is essential if water white liquid sugar in profitable commercial quantities is desired from highly colored resinous molasses under various operating conditions.

Bone char, activated bauxite and similar materials may be used in place of vegetable charcoal. This treatment is made in the cold, that is, at a temperature ranging from 0° C. to 60° C. A temperature of 0° C. is to be preferred. In this way, little, if any, of the suspended sand (silicon dioxide) dirt, iron rust, etc., in the molasses will be dissolved. Samples of molasses solution should be taken from time to time and a physical and chemical check made. When no more precipitate is formed upon the addition of the acid defecating compound or material (oxalic acid) to a clear filtered treated molasses solution and when the color of molasses solution has changed to light lemon yellow or orange, one may proceed to the next step. The molasses is decanted off from the precipitate which has settled to the bottom of the tank and then pumped through a press type filter. In this way a maximum of filtration problems are eliminated as one does not have to handle the bulk of the precipitated matter. A leaf type filter may be used for filtration if so desired. When the press type filter is used it is advisable to use duck cloth and filter paper. The filter paper is placed in such a position that the filteraid used in the precoating of the filter is forced on the filter paper rather than the duck cloth. This will save expensive cloth, speed up the filtering process and aid in cleaning of the cloth. It will also brighten up and free the filtrate of suspended matter. The customary amount of filteraid is used in precoating the filters and in the solution to be filtered. This step is known as the Predefecation, Preclarification and Partial Hydrolysis treatment.

By using larger and a number of settling tanks the operation is continuous.

Approximately 750 gallons of clear lemon yellow or light orange molasses solution from the preceding step is now pumped into three 300-gallon stainless steel tanks. Wood or glass lined tanks may be used, if desired. The aqueous molasses solution is now treated with an alkali metal precipitant such as hydrofluosilicic acid or one of its salts to remove sufficient of the remaining alkali metals such as potassium, sodium and lithium from the medium. These are the only cations left or remaining in solution at this stage. One to five percent of hydrofluosilicic acid (18 lbs. to 100 lbs.) is added to the mix or enough to precipitate all, or a sufficient amount of the alkali metals so that these elements will not remain in solution in a concentrated form to be objectionable in the finished syrup. Traces or small amounts of potassium and sodium salts found in molasses are desirable in the finished syrup. ¼% to 1% activated charcoal and 1% to 2% of fuller's earth are now added and the mix stirred thoroughly for five minutes and allowed to stand for 15 minutes to one hour. Insoluble sodium fluosilicate and potassium fluosilicate will precipitate out in the cold in a temperature range from 0° C. to 40° C. The preferred temperature is 0° C. This mixture is tested and if all or the desired amount of the alkali metals or elements are precipitated or adsorbed out of the medium, one is ready to proceed to the next step by passing the molasses solution through a filter and pumping into next tanks.

Any soluble fluosilicate may be used in place of the acid. Although thallium fluosilicate is not very soluble, it may be used here as it serves a double purpose as the thallium forms insoluble chlorides while fluosilicate removes the alkali elements. High molecular weight organic acids may also be used for removing alkali elements such as those sulphonic acids which form insoluble salts with alkali elements, sulphonated coal, sulphonated peat moss, sulphonated wood, sulphonated anthraquinone, sulphonated ortho and meta xylene, sulphonated naphthalene, etc., and acid chlorides of the higher fatty acids, carbazole, tannin and formaldehyde resins, phenol and formaldehyde resins, picric acid. Heretofore removal of alkali elements was not made in the cold where maximum precipitation occurs, nor was it recognized that certain acid producing substances, inorganic and organic, could be used in this manner for removing alkali elements.

From the alkali metal removal treatment the molasses is pumped into or through a press filter. The leaf type may be used, if so desired. The treated molasses solution is then pumped into a tall acid and alkali resistant tank of about 1000-gallon capacity. A wooden, stainless steel or glass lined tank may be used if desired. The filtered molasses is clear and of a light lemon-yellow color or light orange. It is free of, or contains only spectroscopic traces of calcium, barium, strontium, zinc, iron, aluminum and silicon. It contains small amounts of sodium, potassium and magnesium. It also contains sulphates, phosphates, carbonates, flourides, etc. At this point, an alkaloidal and protein precipitant is added and the molasses is treated so as to remove objectionable gums, proteins, organic acids, etc. Protein precipitating reagents such as ferrocyanic acid, sulfosalicylic acid, dinitrosaliylic acid, trichloracetic acid, tannic acid, phosphotungstic acid, phosphomolybdic acid, basic aluminum acetate, basic lead acetate, basic beryllium acetate, aluminum acetate and ammonium hydroxide or sodium silicate, basic chromites or any combination of the above or derivatives of same may be used for this purpose. Since proteins are amphoteric they may be precipitated by both acid and alkali reagents.

To illustrate how the above protein precipitants may be used to coagulate, precipitate protein and gums and to neutralize organic acids, the following treatment is cited:

In accordance with this invention, the precipitation of molasses proteins, gums, etc., is conducted in a hydrogen ion concentration ranging from pH of 3 to 10. The pH of the molasses is adjusted from 3.0 to a pH of 5.0–6.0 by the addition of a paste or solution of hydrated lime. To this mixture is added one-fourth to five percent of basic aluminum acetate and the mixture to 180° F. to 200° F. At the above pH the isoelectric point of the molasses proteins is the greatest. The amount of protein precipitant needed will depend on the amount of organic matter present, kind of molasses used, etc. When no more precipitate forms on adding basic aluminum acetate to the hot solution taken from the treatment tank and filtered, this treatment is stopped and hydrated lime added until a pH of 10 is reached, or until no further precipitation is noted by an increased amount of clear saturated lime water. The lime treatment neutralizes some of the organic acids present and precipitates them as the corresponding calcium salt. Heating is continued at 180° F. to 200° F. for 15 to 20 minutes, then the molasses is allowed to cool and permit the copious precipitate to settle to bottom of tank. The settling period is usually from one to eight hours. Basic lead acetate, or one of the mineral or organic acid protein precipitants, may be used in place of basic aluminum acetate. The amounts of each precipitant required to do the job will vary between wide limits.

In the basic aluminum acetate treatment, aluminum hydroxides are formed as soon as the molasses mix becomes alkaline as a gelatinous precipitate. In the reaction which follows, aluminites are formed, some undesirable elements are adsorbed, protein and gums precipitated due to the neutralization of the electric charge of molasses colloid. This reaction destroys the colloidial nature of molasses. This phase or treatment is known as The Defection of Proteins, Gums and Organic Acids and Amines.

The molasses solution from the protein defecation chamber is filtered in the usual way or manner and pumped into a 1000-gallon stainless tank. A wooden or glass lined tank may be used for this purpose, if desired. The molasses solution is then tested for sulphates, phosphates, carbonates, chlorides and fluorides. If the test is positive it should be treated with a basic and alkaline producing compound or material. For this purpose one may use basic lead acetate or alkaline earth metal hydroxides, preferably barium hydroxide, etc., to remove the divalent and trivalent anions and ammoniated coal, water insoluble amines, ammoniated asphalt, etc., to remove the mono valent anions such as chlorides, etc. Usually ⅛% to 1% is sufficient amount of alkaline producing compound to remove the sulphates, phosphates, carbonates and other di and poly valent anions not removed by the lime treatment. From one to 10% is required to remove the chlorides by use of basic and alkaline producing ammoniated compounds or materials. A combination of the two precipitants is preferred in order to obtain complete removal of objectionable ions. By objectionable ions is meant ions which produce a bitter or other unpleasant taste or bad color, especially alkali reacting ions cause the pigments present to show as a black color.

The solution is then tested with oxalic acid to determine whether any barium or other divalent elements are present from the preceding treatment. If the test is positive the mixture is then treated with oxalic acid to remove the barium, calcium, magnesium and any other divalent element in solution. Oxalic acid forms insoluble oxalates with these compounds. Usually from 1% to 3% is sufficient. The mixture is thoroughly agitated and allowed to stand for 20 to 30 minutes. A temperature of 32° F. is to be preferred, although the process is effective at a temperature range of 32 to 200° F.

The solution is then filtered and pumped into tanks filled with granulated bone char at a temperature of 180° F. to 200° F. and circulated or allowed to remain in tanks until all color is removed. The oxalic acid is adsorbed in the bone char. It may be neutralized with lime before going into bone char, if desired. The water white liquid sugar is filtered. If one wishes to remove last traces of minerals from the liquid sugar, it may be run through cation and anion remover of ion exchange resins. This is not necessary but is an optional additional step since liquid sugar is produced after bone char treatment which completes the chemical phase of the process. However, it has been discovered that the ion exchange treatment is desirable to produce a highly refined and uniform liquid sugar under various operating conditions, that is, production of refined liquid sugar from various kinds of molasses. After the bone char or ion exchange, whichever is used as stopping point, the aqueous liquid sugar solution is evaporated to a 42° or more Beaumé syrup in vacua. Evaporation may be accomplished faster by using triple effect evaporators up to 30° Beaumé and then finishing off in vacuum pan.

Liquid sugar as herein described is a new and distinctive type of product which heretofore has never been prepared commercially from molasses products. Liquid sugar may be colored or water white. The color is usually indicative of the quality but not necessarily so as liquid sugar and syrup may be water white and yet contain non sugar solids in excess of 7% and as much as 20%. Although some of the reagents have been used heretofore they have been used in a different manner to produce new improvements and results in the finished product. It is to be distinctly understood that liquid sugar and syrup prepared and produced by the process herein disclosed contains sucrose, glucose or dextrose, fructose or levulose and not more than 7 grams or less than 3 micrograms of non sugar solids per 100 grams of liquid sugar or syrup. The remaining non sugar solids consist of small amounts of potassium, sodium, calcium, phosphorus, chloride, pectin, B vitamins, vitamin E, nucleic acids and the like. The polarization or pol of the sugar ranges from +20 to −19 when cane molasses is used.

If the mono and di saccharide sugars are desired in a solid state or powdered form, the liquid sugar may be sprayed and dried, drum dried or the liquid sugar may be dehydrated in some other manner.

It is further understood that liquid sugar and syrup may be prepared or produced from beet molasses or molasses made from fruit juices by the above process. The amounts of the various reagents used will be different as the mineral matters, organic constituents in various molasses products differ between wide limits. However, the end products will be similar in nature and character.

As an alternate to the herein disclosed process and method, liquid sugar and syrup may be made and produced from molasses made from cane, beet and fruit juices such as citrus by omitting the predefecation and preclarification step, and the defecation of the alkali elements and start in with defecation of proteins and organic matter and proceed thereafter as described. In this treatment, ion exchange would be relied upon to remove the bulk of the anions and cations in the molasses. This type of treatment would work satisfactorily for first molasses, refiners molasses, corn feeding molasses, Georgia cane molasses and similar products. In this type of product the ash content is moderately low. With blackstrap and feeding molasses the cost of removing the ash or mineral matter with ion exchange methods now in use would be prohibitive.

While in the foregoing description a number of illustrations and examples have been given, it will be understood that the present invention is not limited in its application to the specific examples described nor to the specific applications of liquid sugar or syrup produced or manufactured. This invention primarily contemplates the processing and manufacture of mono and di saccharide sugars, liquid sugar and syrup from any molasses product by treating the molasses with an acid compound or material which will remove cations from the field of action by precipitation, adsorption or chemical union, removing organic matter in the form of proteins, gums, organic acids and amines by means of a protein and alkaloidal precipitant; removing anions by means of a basic and alkaline producing compound or material by chemical union, precipitation and adsorption; developing and purifying with bone char, activated vegetable charcoal; removing of trace elements with ion exchange resins and evaporation into a liquid sugar or syrup under reduced pressure or vacuo. It further contemplates that by this process a water white liquid sugar from highly colored and resinous molasses may be prepared which was heretofore unknown and that said product contain not more than 7% of non sugar solids nor less than three micrograms per 100 grams of finished product which distinguishes it from any other product on the market. The non sugar solids are measurable as they consist of B vitamins, vitamin C, vitamin E, valuable potassium, sodium and calcium salts in trace amounts, etc. Since it is apparent that many modifications, applications and adoptions of the present invention will present themselves to other skilled in the art without departing from the spirit of this invention, for example, sulphuric or meta phosphoric acid may be used in place of oxalic acid, it is understood that the use of any such individual features as do not depart from the spirit of this invention are, although not specifically described herein, contemplated by and within the scope of the appended claims. Having described my invention, I claim:

1. In the art of sugar manufacture the process for producing mono and disaccharide sugars in an edible and concentrated liquid state from a colored inedible aqueous molasses solution which comprises treating a molasses solution with ⅛ to 2% of a defecating acid together with ½ to 2% of an adsorbent earth and ½ to 2% of a decolorizing charcoal based on molasses weight at 0° to 60° C., and until a pH of 3.5 is reached to precipitate the cations of calcium, barium, iron, strontium, lead and other elements as insoluble compounds and to remove a portion of the highly colored pigments and resins; settling, decanting and filtering, precipitating and adsorbing the potassium, sodium and lithium cations with 1 to 5% of hydrofluosilicic acid, 1 to 2% of fuller's earth and ¼ to 1% of activated charcoal at 0° to 40° C., filtering, adding hydrated lime to adjust the molasses to a pH of 5 to 6, heating to 180 to 200° F. and adding basic aluminum acetate to precipitate proteins, adding hydrated lime to increase the pH to 10, allowing to settle from one to eight hours, decanting and filtering, adding ⅛ to 1% of alkaline earth metal hydroxide to partially remove sulfate, carbonate and phosphate anions, adding from 1 to 10% of a basic organic ammonia compound to remove the chloride anion, cooling to 32° F. and acidifying with 1 to 3% of oxalic acid to remove remaining traces of calcium and barium, filtering and circulating through columns of bone char at a temperature of 180 to 200° F. to remove coloring matter, filtering, passing through a cation exchanger to remove traces of objectionable cations in exchange for hydrogen ions and through an anion exchanger to remove remaining undesirable anions and acids and concentrating the resulting sugar solution to a Baumé of 30 to 42° whereby a liquid sugar is produced containing from 3 micrograms to 7 grams of B vitamins and other non-sugar solids per 100 grams of liquid sugar.

2. In the art of sugar manufacture the process for producing highly refined liquid sugar from colored medium low ash content cane molasses which comprises adding hydrated lime to adjust the molasses to a pH of 5 to 6, heating to 180 to 200° F., and adding basic aluminum acetate to precipitate proteins, adding hydrated lime to increase the pH to 10, allowing to settle from one to eight hours, decanting and filtering, adding ⅛ to 1% of alkaline earth metal hydroxide to partially remove sulfate, carbonate and phosphate anions, adding from 1 to 10% of a basic organic ammonia compound to remove the chloride anion, cooling to 32° F. and acidifying with 1 to 3% of oxalic acid to remove remaining traces of calcium and barium, filtering and circulating through columns of bone char at a temperature of 180 to 200° F. to remove coloring matter, filtering, passing through a cation exchanger to remove traces of objectionable cations in exchange for hydrogen ions and through an anion exchanger to remove remaining undesirable anions and acids and concentrating the resulting sugar solution to a Baumé of 30 to 42° to whereby a liquid sugar is produced containing from 3 micrograms of 7 grams of B vitamins and other non-sugar solids per 100 grams of liquid sugar.

3. The process of claim 1 wherein the defecating acid is oxalic acid, the alkaline earth metal hydroxide is barium hydroxide, and the basic organic ammonia compound is an insoluble organic amine.

4. The process of claim 1 wherein the defecating acid is oxalic acid, the alkaline earth metal hydroxide is barium hydroxide, and the basic organic ammonia compound is an ammoniated coal.

JOHN PAUL BARTZ

REFERENCES CITED

The following references are of record in the file of this patent:

UNITED STATES PATENTS

| Number | Name | Date |
|---|---|---|
| 9,099 | Oxland | July 6, 1852 |
| 60,243 | Reid | Dec. 4, 1866 |
| 127,447 | Allaire | June 4, 1872 |
| 557,643 | Bielmann | Apr. 7, 1896 |
| 699,933 | Spreckels | May 13, 1902 |
| 770,700 | Roeseler | Sept. 20, 1904 |
| 1,150,194 | Horne | Aug. 17, 1915 |
| 1,493,967 | Cutler | May 13, 1924 |
| 1,545,318 | Hebden | July 7, 1925 |
| 2,075,127 | Mead | Mar. 30, 1937 |
| 2,221,683 | Smit | Nov. 12, 1940 |
| 2,408,418 | Erickson | Oct. 1, 1946 |

FOREIGN PATENTS

| Number | Country | Date |
|---|---|---|
| 1,510 | Great Britain | of 1853 |

OTHER REFERENCES

Ser. No. 359,575, Smit (A. P. C.), published May 11, 1943.